(12) United States Patent
Mandalia et al.

(10) Patent No.: US 7,869,583 B2
(45) Date of Patent: Jan. 11, 2011

(54) REAL TIME MEETING SETUP SERVICE

(75) Inventors: Baiju D. Mandalia, Boca Raton, FL (US); Joseph G. Rusnak, Durham, NC (US); Robert J. Sundstrom, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1315 days.

(21) Appl. No.: 11/198,452

(22) Filed: Aug. 5, 2005

(65) Prior Publication Data

US 2007/0036320 A1 Feb. 15, 2007

(51) Int. Cl.
*H04M 3/42* (2006.01)
(52) U.S. Cl. .............. 379/201.01; 379/265.01; 705/26; 705/27
(58) Field of Classification Search .......... 705/26, 705/27; 379/201.01, 265.01
See application file for complete search history.

(56) References Cited

U.S. PATENT DOCUMENTS

| | | | |
|---|---|---|---|
| 4,145,578 A * | 3/1979 | Orriss | 379/188 |
| 6,222,536 B1 | 4/2001 | Kihl et al. | |
| 6,385,652 B1 | 5/2002 | Brown et al. | |
| 6,519,576 B1 | 2/2003 | Freeman | |
| 6,721,783 B1 | 4/2004 | Blossman et al. | |
| 6,937,715 B2 * | 8/2005 | Delaney | 379/265.09 |
| 6,959,405 B2 * | 10/2005 | Hite et al. | 714/57 |
| 2001/0007332 A1 | 7/2001 | Kjonaas et al. | |
| 2001/0056401 A1 | 12/2001 | Tompkins | |
| 2002/0188565 A1 | 12/2002 | Nakamura et al. | |
| 2002/0188674 A1 | 12/2002 | Brown et al. | |
| 2003/0097331 A1 | 5/2003 | Cohen | |
| 2003/0101116 A1 | 5/2003 | Rosko et al. | |
| 2005/0195960 A1 * | 9/2005 | Shaffer et al. | 379/265.02 |
| 2005/0203809 A1 * | 9/2005 | Stone et al. | 705/27 |
| 2007/0019617 A1 * | 1/2007 | Hancock et al. | 370/352 |

OTHER PUBLICATIONS

Aiz et al. EP 1 536 361, Web based CRM service using on-line presence information Nov. 25, 2003.*

* cited by examiner

*Primary Examiner*—Quynh H Nguyen
(74) *Attorney, Agent, or Firm*—Cuenot, Forsythe & Kim, LLC (57) ABSTRACT

A method of automatically organizing a meeting can include selecting a customer profile associated with a customer, identifying a representative according to the customer profile, and determining an availability for the representative based upon context information for the representative. The method further can include scheduling a meeting between the customer and the representative based upon the availability of the representative, and storing the meeting. A measure of availability for the representative can be determined according to the context information and a rating for the customer can be determined. A determination that the representative is not available can be overridden according to the measure of availability for the representative and the rating for the customer.

19 Claims, 3 Drawing Sheets

REAL TIME MEETING SETUP SERVICE

BACKGROUND

1. Field of the Invention

The present invention relates to pervasive computing and, more particularly, to meeting setup using various communication channels and/or automated processes.

2. Description of the Related Art

Communication technology is advancing at a rapid pace. One notable advance has been the convergence of voice and data communications. To some degree, both voice and data now can be carried over a single network. Convergence has lead to the development of unified systems which are capable of sending and receiving messages over a variety of different communication channels, referring to different forms of communication such as electronic mail, paging, facsimile, instant messaging, telephony, and the like. For example, when a sending user attempts to contact a target individual, a message from the sender can be transmitted over one or more of these communication channels.

Within such messaging systems, a communication channel often is selected according to a profile associated with the target user. For example, a profile can specify that messages sent through the messaging system to the target user should be forwarded as electronic mails on Mondays or as facsimiles on Tuesdays. One can see that the flexibility afforded by such messaging systems can significantly increase the effectiveness of communications within an organization.

To date, however, these capabilities have not been successfully integrated into the routine business processes performed within an organization. Conventional messaging systems have not been used within organizations in a proactive manner which complements or supports customer service functions. Accordingly, it would be beneficial to provide a system which actively supports and fosters customer service activities within a business and/or organization.

SUMMARY OF THE INVENTION

The present invention provides a solution for real time meeting setup. One embodiment of the present invention can include a method of automatically organizing a meeting. The method can include selecting a customer profile associated with a customer, identifying a representative according to the customer profile, and determining an availability for the representative based upon context information for the representative. The method further can include scheduling a meeting between the customer and the representative based upon the availability of the representative, and storing the meeting. A measure of availability for the representative can be determined according to the context information and a rating for the customer can be determined. A determination that the representative is not available can be overridden according to the measure of availability for the representative and the rating for the customer.

Another embodiment of the present invention can include a system for establishing meetings including a computer executing an application that selects a customer profile associated with a customer and identifies a representative associated with the customer profile. The system further can include a plurality of messaging systems, each being associated with a particular communication channel and an intelligent notification system that determines context information for the representative. The application can schedule, and store, a meeting between the customer and the representative based upon the availability of the representative as determined from the context information. A measure of availability for the representative can be determined according to the context information and a rating for the customer can be determined. A determination that the representative is not available can be overridden according to the measure of availability for the representative and the rating for the customer.

BRIEF DESCRIPTION OF THE DRAWINGS

There are shown in the drawings, embodiments which are presently preferred; it being understood, however, that the invention is not limited to the precise arrangements and instrumentalities shown.

DETAILED DESCRIPTION OF THE INVENTION

The present invention provides a method, system, and apparatus for real time meeting setup. In accordance with the inventive arrangements disclosed herein, a meeting can be arranged between a customer and one or more organization representatives in an automated fashion. A meeting setup service can be configured to determine availability of the representative(s) and schedule a meeting between the representative(s) and the customer based upon that availability. In determining availability, the meeting setup service can interact with the representative(s), in real time, over any of a variety of communication channels. The meeting can be conducted via one of the communication channels or as an in-person meeting.

Figure 1:
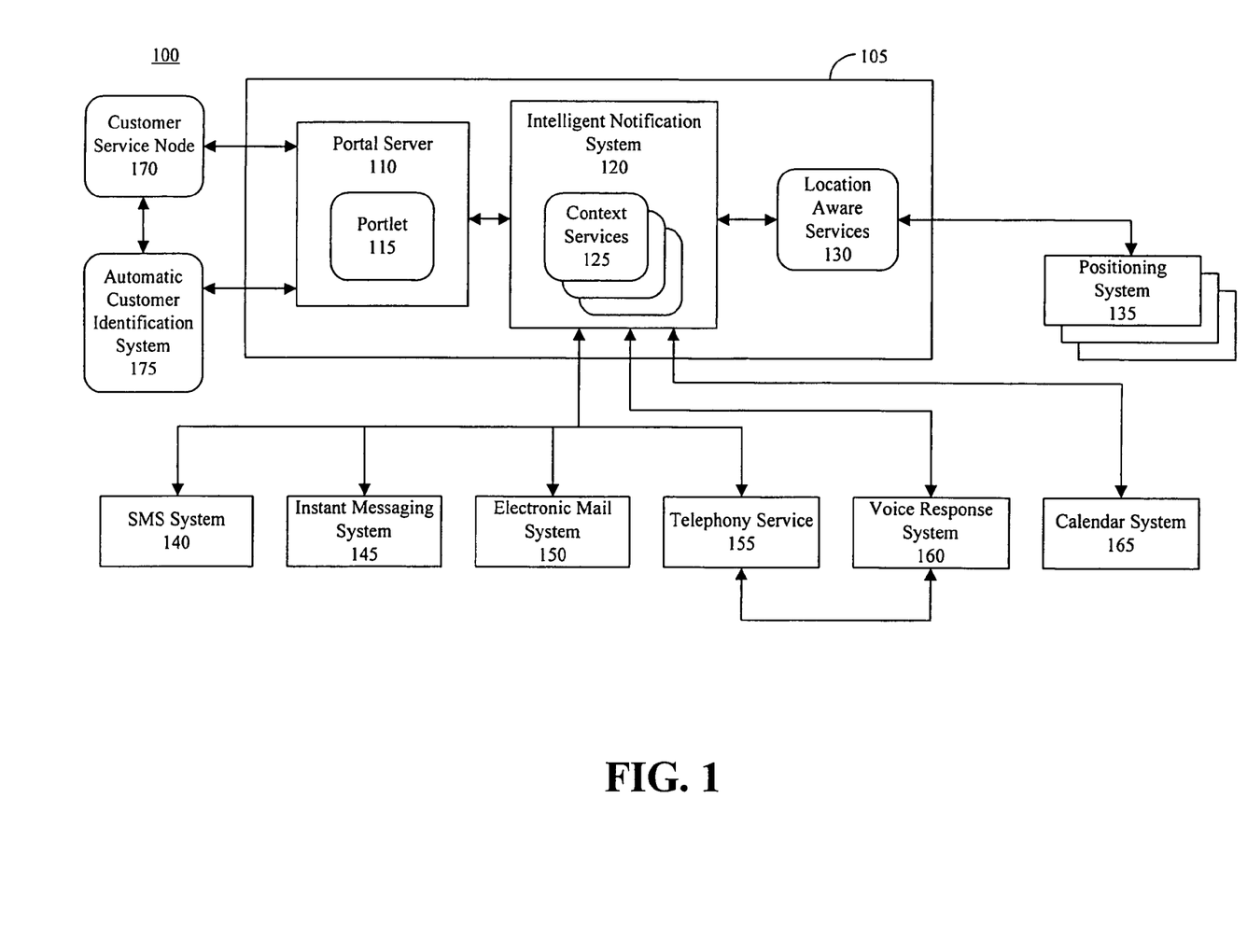
FIG. 1 is a block diagram illustrating a real time meeting setup service in accordance with one embodiment of the present invention.

FIG. 1 is a block diagram illustrating a real time meeting setup service (meeting service) 100 in accordance with one embodiment of the present invention. The meeting service 100 can include an on-demand computing environment (computing environment) 105 for providing applications to mobile users. Computing environment 105 can be configured as a middleware platform that provides an integrated client-server environment and application development tools to extend business applications and data to mobile devices. Computing environment 105 provides the back-end integration framework necessary for providing functions including, but not limited to, mobile personal information management, electronic mail synchronization, and access to World Wide Web (Web) based and other content.

In one embodiment, the computing environment 105 can be implemented as WebSphere® Everyplace Access, which is commercially available from International Business Machines Corporation of Armonk, N.Y. (IBM). WebSphere® Everyplace Access is described in greater detail in the following publications, which are incorporated herein by reference: IBM WebSphere Everyplace Access V5 Handbook for Developers and Administrators, Volume IV: Advanced Topics, IBM (March 2005); IBM WebSphere Everyplace Access V5 Handbook for Developers and Administrators, Volume II: Application Development, IBM (March 2005); and Adding Voice to your Portlet Applications, IBM (July 2004). In any case, the use of a particular computing environment 105 is not intended to limit the scope of the present invention.

The computing environment 105 can include a portal server 110, an intelligent notification system (INS) 120, as well as location aware services 130. The portal server 110 provides a simple, unified access point through which a variety of functions can be accessed. Although the term "portal" can be used in reference to Web-based applications, this need not be the case. The portal server 110 can be implemented as an application that provides content and/or functionality aggregation regardless of whether the Web or markup language(s) are used. For example, in one embodiment, the portal server 110 can be implemented as WebSphere® Portal, which is available from IBM.

The portal server 110 can include one or more portlets 115. In general, each portlet 115 can serve as a reusable software component which can execute within the portal server 110. In illustration, one portlet can provide a function such as document searching, another can provide for user login and/or security, and another can serve as an electronic mail client. With respect to the present invention, a portlet 115 can be provided which allows a customer and/or a customer service representative to query the system to reach other representatives of the organization. The portlet 115 can interact with the INS 120 to provide automated messaging, query, and dialog functions. Each portlet 115 can be considered a complete application which can follow a standard model-view-controller design. Each portlet 115 further can have multiple states and view modes, as well as event and messaging capabilities.

In general, the INS 120 collects context information from any of a plurality of different sources. This allows enterprises to send messages to mobile users to improve information flow and business efficiency. Context services 125 are disposed within the INS 120. The context services 125 can acquire and analyze context information relating to the availability of personal representatives (users) and make this information available to the INS 120 and other components that may have a need to use such information.

As used herein, context information can include, but is not limited to, information relating to one or more individuals as may be acquired from any combination of location aware services 130, a calendar system 165, positioning systems 135, and presence-providing systems such as instant messaging (IM) system 145 and/or a telephony service 155, which can be implemented as an Internet Protocol (IP) telephony system. With respect to the messaging systems 140-155, for example, the context services 125 can be configured to communicate with presence servers through appropriate communication protocols such as SIP for Instant Messaging and Presence Leveraging Extensions (SIMPLE) for communication with an IM system 145 presence server, Parlay for communicating with a telephony service 155 presence server, and the like.

It should be appreciated that the listing of systems from which context information can be derived is not intended to be exhaustive. As such, the list serves only as an example of some of the different types of systems that can be used in conjunction with the INS 120 and from which context information can be obtained for purposes of determining availability of an individual. For example, other means of determining context information can include, but are not limited to, providing a network-connected application that representatives can use to manually toggle availability from available to not available similar to an IM system. Workstation agents can be used which detect activity on the workstation and the type of activity that is taking place on the workstation such as the particular application being used, whether a Web conference is ongoing, and the like. Motion and/or sound detectors can provide context information. Other examples of context information can be found within J. Fogarty and S. Hudson, *Examining the Robustness of Sensor-Based Statistical Models of Human Interruptibility*, CHI 2004, Apr. 24-29, 2004, Vienna, Austria, which is incorporated herein by reference.

In any case, the INS 120 can interact with different messaging systems such as Short Message Service (SMS) system 140, which can be implemented as a Wireless Application Protocol (WAP) based system, IM system 145, electronic mail system 150, telephony service 155, and voice response system 160. The INS 120 can instruct the various messaging systems to send messages, interpret user response data received from the messaging systems, as well as implement the communications capabilities between these systems and the location aware services 130.

For example, a context service 125 can be provided which polls the IM system 145 to determine whether a particular user is logged onto the IM system 145. The context service 125 further can be tasked with communicating with the IM system 145 to command the IM system 145 to send a communication, i.e. an instant message, as well as interpret data received from the IM system 145 such as user responses. In another example, a context service 125 can be provided which can query the calendar system 165. The context service 125 can be configured to interact with the calendar system 165 to obtain scheduling information for selected user(s).

In another example, the INS 120 can interact with the voice response system 160 and instruct it to perform various functions. Voice response system 160 can perform functions such as placing telephone calls and conducting dialogs with a call recipient. Accordingly, the voice response system 160 can provide functions including, but not limited to, executing applications such as Voice Extensible Markup Language (VoiceXML) applications, playing recorded prompts, prompting users through text-to-speech technology, speech recognizing user spoken utterances, and recognizing dual tone multi-frequency (DTMF) input. These capabilities can be used to supply interactive voice response functions for telephone calls conducted over telephony service 155.

one embodiment, the voice response system 160 can be implemented as, or include, WebSphere® Voice Response, WebSphere® Voice Application Access, and WebSphere® Voice Server, each being available from IBM. WebSphere® Voice response provides telephony connectivity to WebSphere® voice applications, which can be executed therein. WebSphere® Voice Server provides text-to-speech functionality and automatic speech recognition functions. WebSphere® Voice Application Access provides rendering of voice to WebSphere® Portal applications thereby voice-enabling portlets 115.

Users can subscribe to services set up by a system administrator, and receive timely, personalized alerts through the INS 120. The INS 120 allows users to subscribe to events and to specify an action to be taken when a match is found between a subscription and an event that is passed to the INS 120. For example, the communication capabilities of the INS 120 can be used to notify a user of the event.

Thus, the INS 120 and/or the context services 125 can be configured to perform a variety of different functions relating to context information. Other examples of functions which can be performed by the INS 120 can include collecting, maintaining, and disseminating context information as disclosed in U.S. Patent Publication No. 2003/0018692 entitled "Method and Apparatus for Providing a Flexible and Scalable Context Service"; providing context-aware unified communication for enabling communications between users over a common communications platform or heterogeneous communication platforms as disclosed in U.S. Patent Publication No. 2004/0203664 entitled "System and Method for Context- Aware Unified Communications"; as well as fuse context data for use by context aware applications as disclosed by U.S. Patent Publication No. 2004/0111397 entitled "Method and Apparatus for Fusing Context Data". Each of these patent publications is incorporated herein by reference.

Location aware services 130 provide a framework for integrating real time location information into communications and business applications. In one embodiment, the location aware services 130 provide the functionality and/or interfaces necessary for interacting with various positioning systems 135. Each location aware service 130 can be tasked with communicating with a particular positioning system 135. The positioning systems 135 can include, but are not limited to, short range wireless location tracking systems such as those based upon one of the 802.11 wireless communication protocols, Global Positioning Systems, and the like. In any case, the location aware services 130 can communicate with the various positioning systems 135 to determine whether a particular user, or more particularly mobile user device, is locatable, and if so, the location for that device and corresponding user.

Location aware services 130 also can be organized at a higher level. For example, the location aware services 130 can include services such as geocoding in reference to determining geographical coordinates for an address received as input, reverse geocoding, directory services where points of interest are located proximate to a given location, routing in reference to determining physical directions from one location to another, mapping which provides a map of a designated location, and device positioning which returns a location of a user's device.

In operation, as a customer enters a physical business establishment, the customer can be identified. In one embodiment, customer identification can be performed in an automated manner using automatic customer identification system 175. For example, the automatic customer identification system 175 can be implemented as a Radio Frequency Identification (RFID) system configured to read RFID tags which can be carried by customers. The automated customer identification system 175 also can be implemented as a card reader or other reading or scanning type of device capable of extracting information from magnetic cards, electronic cards, wireless devices, and/or other electronic wallets.

It should be appreciated that while the present invention is described in the context of a customer entering a physical business establishment, the inventive arrangements disclosed herein also can be applied to situations where a user accesses a virtual bank via the Internet, a customer service representative over a telephone call, or a business entity through some other means of remote access. Also, the particular manner in which the customer is identified is not intended as a limitation of the present invention. For example, conventional user names and passwords can be used as well as biometric information such as voice prints, finger prints, and the like.

Identification information can be made available to a portlet 115 and/or can be provided to a customer service node 170 so that a customer service representative can view or otherwise access the information to greet the customer. The customer service node 170 can be a communication system capable of providing one or more of the messaging capabilities described herein. It should be appreciated that, in another embodiment, a customer service representative can interact with the customer to determine his or her identity in a manual fashion.

In any case, customer identification information can be provided to the portlet 115, which can identify a personal representative, i.e. an employee of the organization, that has been assigned to the customer. The portlet 115 can interact with the INS 120 to determine availability of the representative. As noted, the INS 120 can determine context information so that the portlet 115 can determine the availability of the personal representative. As noted, context information can include, but is not limited to, location of the representative as determined by location aware services 130, presence information for the personal representative from the messaging systems 140-155, calendar information from calendar system 165, or any combination thereof. This information can be provided back to the portlet 115.

Availability of the personal representative can be determined based upon the context information. In one embodiment, a level or measure of availability can be determined which indicates whether, or under what circumstances, the personal representative can be interrupted when considered unavailable. Such determinations can be dependent upon the available context information for the representative as well as one or more attributes relating to the customer, such as identity, the amount of business transacted by the customer, or the type of matter about which the customer has contacted the business organization. Information such as the reason for the customer contacting the business organization can be collected by the customer service representative and provided to the portlet 115.

For example, in cases where the personal representative is not considered available, the portlet 115 can compare a customer rating with a measure of availability for the personal representative to determine whether the personal representative should be interrupted to deal with the customer. Measures of availability can be determined using a policy which prioritizes and/or weights different types of context information for the personal representative. Customer ratings can be based upon any of a variety of attributes of the customer, such as the amount of business the customer has transacted, whether any transactions are pending, other attributes from the customer profile, or the like. Depending upon the level of availability of the personal representative and the customer rating, the personal representative can be interrupted, i.e. via one of the messaging systems.

For example, if the personal representative is on the telephone, the personal representative can be considered to be unavailable. Telephone activity can be associated with a low level of availability, i.e. the personal representative is not available except in rare cases. If the customer rating, however, is above a predetermined threshold, the telephone call of the personal representative can be interrupted. The INS 120 can cause a call to be placed to the personal representative to interrupt the call, cause an IM to be sent, etc.

Based upon the availability of the personal representative, the portlet 115 can instruct the INS 120 to notify the personal representative, using one or more messaging systems 140-155 and associated communication channels, about the need or possibility of meeting with the customer. In one embodiment, the messaging system used to notify the personal representative can conduct a dialog to determine information such as whether the personal representative is presently available for a meeting, a possible future meeting time, and/or a desired communication channel over which the meeting can be conducted.

Any information determined from the responses of the personal representative in the course of the dialog, whether in the form of text or speech, can be processed and used to further query the personal representative. This information also can be provided back to the customer service representative at the customer service node 170 so that the customer service representative can relay such information to the customer. For example, speech can be rendered through the portlet 115 using the voice response system 160.

Figure 2:
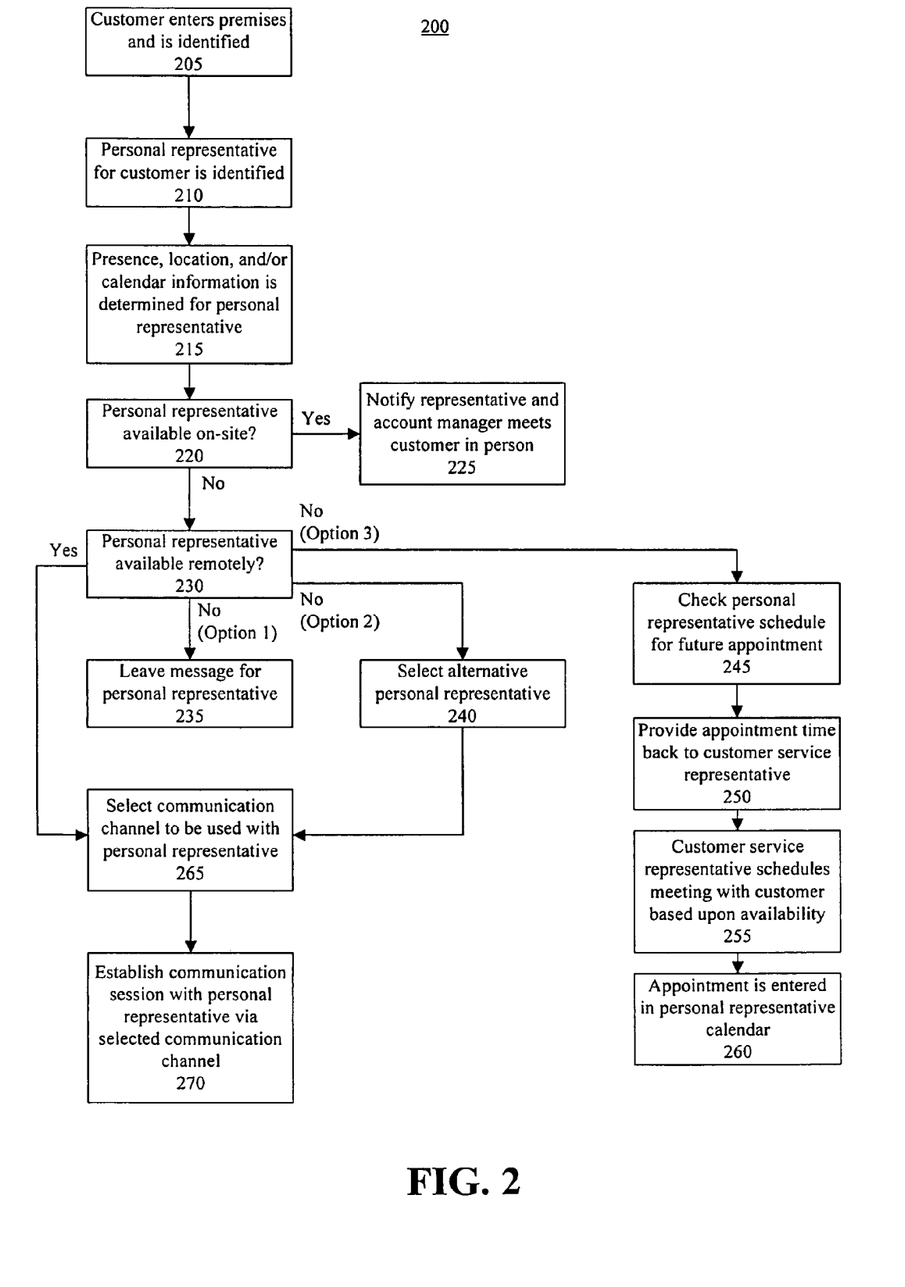
FIG. 2 is a flow chart illustrating a method of setting up a meeting in real time in accordance with another embodiment of the present invention.

FIG. 2 is a flow chart illustrating a method 200 of real time meeting setup in accordance with another embodiment of the present invention. Method 200 can be performed using the system described with reference to FIG. 1. While method 200 will be described with reference to a banking establishment, it should be appreciated that the present invention is not limited to use in such an industry. The present invention can be used in any of a variety of different business applications to provide for meeting setup and the like, particularly in the context of customer service and support.

Method 200 can begin in step 205 where a customer enters a business establishment, such as a bank, and is identified. In one embodiment, the customer can be identified in a manual fashion. A customer service representative of the bank, for example, can greet the customer and determine the identity of the customer through verbal interaction and/or by checking identification. The customer service representative can access a portlet via the customer service node and provide the customer identification data.

In another embodiment, the customer can be identified through an automated process. For example, the customer can carry some sort of identification device, whether an RFID tag, magnetic card, electronic card, wireless device, etc. The device can be scanned by an automatic customer identification system so that the customer is identified automatically. As noted, other means of identification can be used including, but not limited to, username and/or password as well as biometrics. Further, as noted, the customer need not enter a physical building, but can access the business establishment using a remote communication technology. Customer identification data automatically can be provided to a portlet 115, which can identify and/or select a profile for the customer data.

In step 210, a personal representative corresponding to the customer can be identified. Each customer can be associated with a personal representative of the bank, such as an account representative. The account representative can be assigned to the customer to provide various services and to monitor the customer's relationship with the bank. The identity of the personal representative can be stored as part of the customer profile, or can be associated with the customer within the banking system or meeting setup service in some other manner. The personal representative also can be selected by matching attributes, i.e. skills, of the personal representative as specified within a user profile with attributes of the customer profile.

Though the present invention is described with reference to a single personal representative for each customer, it should be appreciated that each customer can be associated with one or more representatives if so desired. For example, each customer can be assigned to a personal representative and one or more experts of the business organization depending upon that customer's need. As such, the present invention can be applied to cases where the customer is linked with "N" different representatives and contact with one or more of such representatives is desired for a meeting.

In step 215, the portlet can determine availability for the personal representative associated with the customer. As noted, the INS can continually poll the various messaging systems and collect context information relating to the personal representative. For example, as noted, the INS can determine whether the personal representative has a presence on, or is logged into, one or more of the messaging systems. The INS also can query the location aware services, which communicate with the positioning systems, to determine a location for the personal representative. In addition, the INS can access the calendar of the personal representative to determine whether the personal representative is presently available for a meeting.

It should be appreciated that in determining the availability of the personal representative, or any other employee, a policy can be established within the portlet to interpret context information received from the INS. The policy can favor one type of context information over another. Different types of context information such as calendar, presence, location, or subsets thereof such as IM presence, telephony presence, and the like, can be prioritized and/or weighted as may be required. For example, presence information can be set as being more important than location or calendar information when determining availability. In another example, calendar information can be set as having the highest priority. This allows system administrators to establish policies defining a hierarchy of context information importance for determining availability or measures of availability as the case may be.

The policies can vary in complexity in order to resolve conflicts or ambiguities between the different types of context information. For example, a policy can indicate that if a conflict arises between calendar information and presence information, then presence information is used in lieu of calendar information. Thus, if the calendar system indicates that the personal representative is free, but the personal representative does not have a presence on any messaging system, a determination can be made that the personal representative is not available. Similarly, if the calendar system indicates that the personal representative is free, but the personal representative is off-site and does not have a presence on a messaging system, a determination can be made that the personal representative is not available.

In any case, context information can be passed back to the portlet upon request, for example responsive to a customer service representative querying the availability of the personal representative, or automatically responsive to identification of the customer. For example, the customer service representative can determine that a meeting between the customer and the personal representative is worthwhile for any of a variety of reasons, including, but not limited to, a showing of goodwill on behalf of the bank, up-selling the customer, or following-up with the customer regarding a specific service, such as a mortgage application.

In step 220, the portlet can determine whether the personal representative is available within the business location. Based upon which messaging systems the personal representative is logged onto, the location of the personal representative, if ascertainable, and the availability of the personal representative as specified in the calendar system, the portlet can determine whether the personal representative is on-premises and available to meet with the customer. If so, the method can proceed to step 225.

In step 225, the portlet can cause a message to be sent to the personal representative. The message can advise the representative to come out and meet with the customer as the customer is currently on-site. Using the presence information, the portlet can cause messages to be sent via more than one communication channel if so configured. As can be seen from FIG. 1, each messaging system can utilize a different communication type or channel, whether IM, electronic mail, telephony (voice), and the like. Accordingly, based upon which messaging system the personal representative has established a presence, or any other context information, the notifications can be sent via those messaging systems or others on the corresponding communication channels.

Continuing with step 230, in the case where the personal representative is not available on-site, a determination can be made as to whether the personal representative is available using a remote communication technology. This determination can be made by the portlet with reference to the availability of the personal representative as specified by the calendar information, the presence information, and the location information previously ascertained. For example, the personal representative may be available via teleconference, videoconference, IM session, or the like, despite being remotely located from the customer, i.e. off-site.

If the personal representative is not available remotely, in one embodiment as shown in step 235, the meeting setup service can send or leave a message for the personal representative. The message can be sent via electronic mail, IM, as a voice mail, or the like. Thus, when the personal representative logs back onto one of the messaging systems, the message can be delivered or made available. It should be appreciated that despite the particular communication channel used to send the message, the message can be automatically created, formatted, and sent. For example, in the case of a voice-mail message, the voice response system can place a call to the extension or telephone number of the personal representative, whether the number is an internal business number, an external landline, or a mobile number. Once connected, the voice response system can leave a voice message, for example by playing a recorded prompt or using text-to-speech technology. The message can indicate that customer "Smith", for example, was in the office and that the representative should contact the customer to discuss a matter or to arrange a meeting.

In another embodiment, if the personal representative is not available, the meeting setup service can select an alternate personal representative to meet with the customer in step 240. The portlet can select another representative having similar qualifications and/or experience as the unavailable personal representative based upon information specified within electronic employee profiles maintained by the bank. The portlet can select an alternate who is available, whether in-person or remotely, for a meeting. The availability of the alternate representative can be determined through an analysis of the context information determined for the alternate representative.

In yet another embodiment, if the personal representative is not available immediately or within a predetermined time period of, for example, five to ten minutes, the method can proceed to step 245 to begin the process of scheduling a future appointment. Accordingly, the personal representative's schedule maintained on the calendar system can be accessed by the portlet and the INS to determine future availability. In step 250, a selected appointment time can be provided back to the customer service representative at the customer service node. The appointment time can be sent as an IM, an electronic mail, using the interactive voice response system via a telephone call, or the like.

In step 255, the customer service representative, having received the communication specifying the availability of the personal representative, can schedule a meeting between the customer and the personal representative based upon the availability specified in the message. More particularly, the customer service representative can ask the customer whether the selected time or range of times is acceptable. If so, the customer service representative can accept or enter the meeting time directly into the portlet, or can respond via return message, whether return IM, by speaking into the telephone to answer the interactive voice response application, or the like. Accordingly, the portlet can be notified of the meeting acceptance and cause an entry for the meeting to the calendar of the personal representative in step 260. The portlet also can cause a meeting notification to be sent to the personal representative over a selected communication channel. The meeting notification can be sent without making an entry in the calendar system or in combination with such an action.

Continuing with step 265, in the case where the personal representative is available remotely, a particular communication channel can be selected by the portlet based upon the context information for the personal representative. For example, if the personal representative is logged into the IM system, IM can be selected as the communication channel over which the meeting with the customer will be conducted. If teleconference is available, i.e. the personal representative is logged into the telephone system, teleconference can be selected. A policy can be established which dictates the particular communication channel(s) to be used based upon the context information.

In step 270, a real time communication session can be initiated with the customer via the selected communication channel. For example, the business organization can include one or more customer kiosk locations which can provide communication functions such as IM, teleconference, videoconference, and the like. The customer service representative can direct the customer to a particular kiosk location and communicate the particular kiosk location to the portlet via the customer service node. The information can be provided to the messaging system so that the communication session can be established between the device of the personal representative and the kiosk to which the customer was assigned.

In another embodiment of the present invention, conflicts between different types of context information can be resolved by establishing a dialog with the personal representative and querying the representative regarding availability. In such an embodiment, availability policies can be established in which communication sessions, i.e. IM or telephony, are established to query the personal representative only in cases where available context information conflicts or is ambiguous when interpreted by the portlet.

Figure 3:
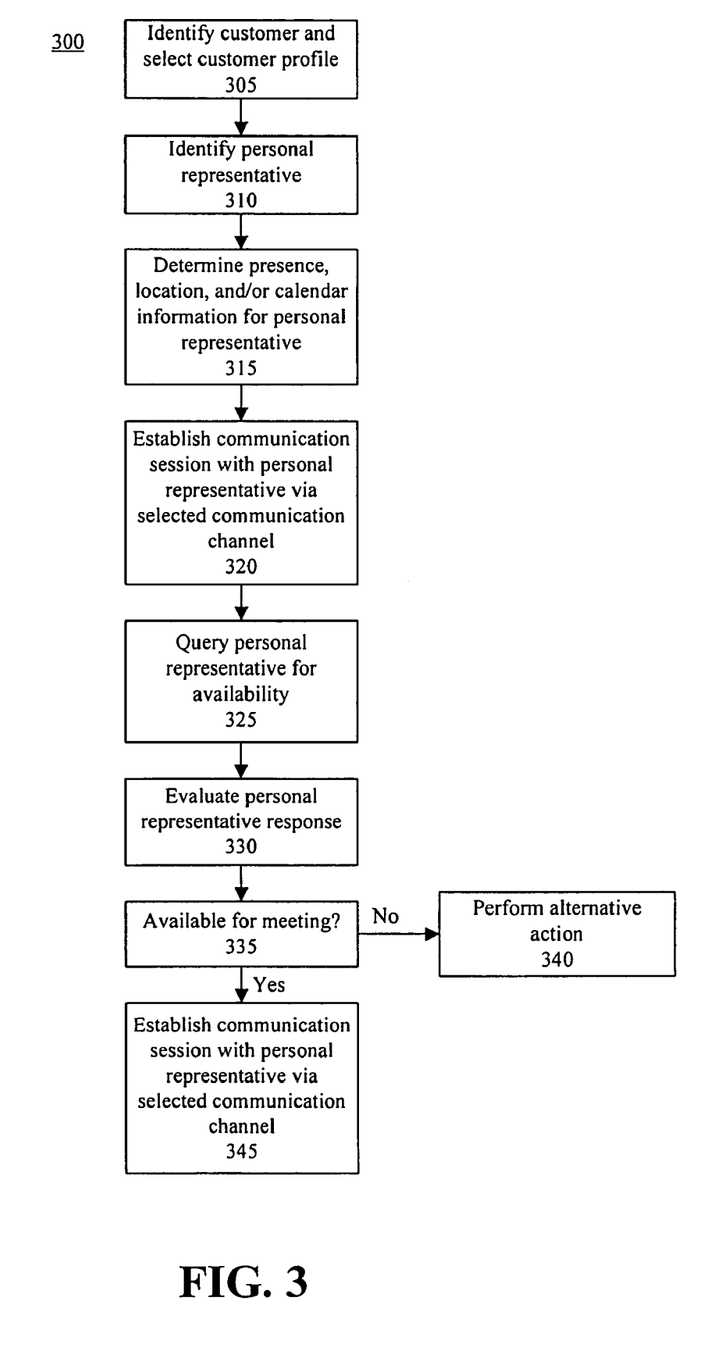
FIG. 3 is a flow chart illustrating a method of setting up a meeting in real time in accordance with yet another embodiment of the present invention.

FIG. 3 is a flow chart illustrating a method 300 of setting up a meeting in real time in accordance with another embodiment of the present invention. Method 300 illustrates a case in which the availability of the personal representative is determined, at least in part, through an exchange between the personal representative and a real time or near real time messaging system such as voice or IM. Method 300 illustrates an embodiment which can be used in place of, or in addition to, access to the personal representative's electronic calendar.

The method can begin in step 305 where a customer is identified and the stored profile corresponding to the customer is identified and/or selected. In step 310, the personal representative associated with the identified customer can be determined. In step 315, context information for the personal representative can be ascertained from the INS and its collaboration with the various messaging, calendaring, location, and other context information providing systems.

A communication session can be established with the personal representative via a selected communication channel using the corresponding messaging system in step 320. For example, if the personal representative has a presence on the telephone network, a telephone call can be automatically placed by the voice response system to the personal representative. Alternatively, if the personal representative has a presence on the IM system, an IM can be sent, etc. Rules can be established to resolve conflicts if more than one messaging system can be used.

In step 325, the messaging system can query the personal representative as to his or her availability. For example, though the calendar of the personal representative may indicate that the individual is presently available and/or in the office, the personal representative may be involved in other business and, therefore, be unable to meet with a customer at that time. By querying the personal representative using a real time exchange, the availability of the personal representative can be determined with a greater degree of certainty.

For instance, in the case of a telephone communications link, the voice response system can establish a call with the personal representative, play a prompt or use text-to-speech to ask the personal representative whether he or she is available to meet with the customer. The voice response system also can inform the personal representative of the identity of the customer. If the communication link is an IM session, the IM message sent to the personal representative can query the individual and provide similar or the same sort of information.

In step 330, the response from the personal representative can be evaluated. More particularly, the response can be processed to determine a meaning as to the availability of the personal representative. In the case of a voice response system, speech recognition can be used to convert the response of the personal representative to text, where it can be evaluated for a positive or negative response to the query. If the response is already in text form, i.e. an IM response message, the message can be parsed to determine whether the personal representative responded in the affirmative or negative in terms of meeting with the client. Such text processing functionality, for example, can be included in one or more of the context services.

In step 335, a determination can be made by the portlet, based upon the response of the personal representative, as to whether a meeting between the customer and the personal representative can be established. If not, the method can proceed to step 340, where an alternative action can be performed, such as attempting to setup another meeting time, setting up a meeting with an alternate personal representative, or the like. If the personal representative is available, a communication session can be established between the personal representative and the customer. The communication session can be established via the same communication channel used to query the personal representative, or a different communication channel as dictated by customer or representative preference, whether IM, telephony, video, or the like. If the personal representative is on-site, an in-person meeting also can be established.

The methods described herein have been provided for purposes of illustration only. As such, neither is intended as a limitation of the present invention. In illustration, it should be appreciated that the automated querying and dialog conducted by the messaging system can be more complex if need be. For example, the messaging system can query the personal representative as to which communication channel is suitable for the meeting, an alternative meeting time, etc.

At any point within the query/dialog process, communications can be sent back to the customer service node so that the customer service representative can verify information with the customer. The communications can specify, for example, any proposals from the personal representative regarding alternate meeting times and/or communication channels. The personal representative can verify such information with the customer. Responses from the customer can be entered into the portlet by the customer service representative via the customer service node, by return message, or by speaking to a voice response application. If needed, information can be exchanged between the portlet and the messaging system to continue the querying process as may be required.

In addition, it should be appreciated that determinations relating to selection of a messaging system and/or availability of a user can be made with reference to availability information and established policies within the meeting setup service, i.e. within the portal or other business logic. Accordingly, the various examples disclosed herein are not intended as a limitation of the present invention.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program, software application, and/or other variants of these terms, in the present context, mean any expression, in any language, code, or notation, of a set of instructions intended to cause a system having an information processing capability to perform a particular function either directly or after either or both of the following: a) conversion to another language, code, or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented method of automatically organizing a meeting comprising:
   via a processor, selecting a customer profile associated with a customer;
   identifying a representative according to the customer profile;
   determining context information for the representative;
   detecting an ambiguity in the context information for the representative;
   via a portlet, establishing a real time communication session with the representative and automatically querying the representative to resolve the ambiguity in the context information;
   determining an availability for the representative based upon whether the ambiguity in the context information is resolved by a response received from the representative;
   scheduling, and storing, a meeting between the customer and the representative
   based upon the availability of the representative;
   determining a rating for the customer that is based on at least one attribute unique to that customer; and
   overriding a determination that the representative is not available according to the measure of availability for the representative and the rating for the customer.

2. The computer-implemented method of claim 1, further comprising automatically identifying the customer, wherein said step of selecting a customer profile is performed responsive to identification of the customer.

3. The computer-implemented method of claim 1, wherein the representative is not available and no meeting is scheduled, said method further comprising:
   selecting an alternate representative;
   determining an availability for the alternate representative based upon context information for the alternate representative; and
   scheduling a meeting between the customer and the alternate representative based upon the availability of the alternate representative.

4. The computer-implemented method of claim 1, further comprising:
   determining, according to context information indicating a presence of the representative on a messaging system, that the representative is immediately available via the messaging system for a real-time communication session with the customer; and
   establishing the real-time communication session between the representative and the customer through a communication channel associated with the messaging system.

5. The computer-implemented method of claim 4, wherein determining an availability for the representative based upon context information for the representative further comprises determining the availability for the representative according to location information for the representative.

6. The computer-implemented method of claim 1, said step of scheduling a meeting further comprising:
   selecting at least one messaging system from a plurality of messaging systems based upon said determining step; and
   messaging the representative via the selected at least one messaging system to schedule the meeting.

7. The computer-implemented method of claim 1, said scheduling step further comprising establishing a real time communication session between the customer and the representative using a messaging system selected from a plurality of messaging systems.

8. The computer-implemented method of claim 1, further comprising:
   identifying the customer when the customer enters a location of a physical business establishment;
   wherein the context information for the representative includes location or presence information for the representative that indicates whether the representative is available within the location of the physical business establishment.

9. A system for establishing meetings comprising:—
   a computer executing an application that selects a customer profile associated with a customer and identifies a representative associated with the customer profile; and
   an intelligent notification system that determines context information for the representative, detects an ambiguity in the context information for the representative, establishes a real time communication with the representative via a portlet, and automatically queries the representative to resolve the ambiguity in the context information;
   means for determining an availability for the representative based upon whether the ambiguity in the context information is resolved by a response received from the representative;
   means for scheduling, and storing, a meeting between the customer and the representative based upon the availability of the representative;
   means for determining a rating for the customer that is based on at least one attribute unique to that customer; and
   means for overriding a determination that the representative is not available according to the measure of availability for the representative and the rating for the customer.

10. The system of claim 9, wherein the representative is not immediately available, said intelligent notification system:
    determining, according to context information indicating a presence of the representative on a messaging system, that the representative is immediately available via the messaging system for a real-time communication session with the customer; and
    establishing the real-time communication session between the representative and the customer through a communication channel associated with the messaging system.

11. The system of claim 9, further comprising:
    a customer identification system that identifies the customer when the customer enters a location of a physical business establishment;
    wherein the context information for the representative includes location or presence information for the representative that indicates whether the representative is available within the location of the physical business establishment.

12. A non-transitory tangible computer readable storage, having stored thereon a computer program having a plurality of code sections executable by the computer for causing the computer to perform the steps of:
    selecting a customer profile associated with a customer;
    identifying a representative according to the customer profile;
    determining context information for the representative;
    detecting an ambiguity in the context information for the representative;
    via a portlet, establishing a real time communication session with the representative and automatically querying the representative to resolve the ambiguity in the context information;
    determining an availability for the representative based upon whether the ambiguity in the context information is resolved by a response received from the representative;
    scheduling, and storing, a meeting between the customer and the representative based upon the availability of the representative;
    determining a rating for the customer that is based on at least one attribute unique to that customer; and
    overriding a determination that the representative is not available according to the measure of availability for the representative and the rating for the customer.

13. The computer readable storage of claim 12 said computer readable storage further causing the machine to perform the steps of:
    automatically identifying the customer, wherein said step of selecting a customer profile is performed responsive to identification of the customer.

14. The computer readable storage of claim 12,
    wherein the representative is not available and no meeting is scheduled, said computer readable storage further causing the machine to perform the steps of:
    selecting an alternate representative;
    determining an availability for the alternate representative based upon context information for the alternate representative; and scheduling a meeting between the customer and the alternate representative based upon the availability of the alternate representative.

15. The computer readable storage of claim 12, said computer readable storage further causing the machine to perform the steps of:
  determining, according to context information indicating a presence of the representative on a messaging system, that the representative is immediately available via the messaging system for a real-time communication session with the customer; and
  establishing the real-time communication session between the representative and the customer through a communication channel associated with the messaging system.

16. The computer readable storage of claim 15, wherein determining an availability for the representative based upon context information for the representative further comprises determining the availability for the representative according to location information for the representative.

17. The computer readable storage of claim 12, said step of scheduling a meeting further comprising:
  selecting at least one messaging system from a plurality of messaging systems based upon said determining step; and
  messaging the representative via the selected at least one messaging system to schedule the meeting.

18. The computer readable storage of claim 12, said scheduling step further comprising establishing a real time communication session between the customer and the representative using a messaging system selected from a plurality of messaging systems.

19. The computer readable storage of claim 12, said computer readable storage further causing the machine to perform the steps of:
  identifying the customer when the customer enters a location of a physical business establishment;
  wherein the context information for the representative includes location or presence information for the representative that indicates whether the representative is available within the location of the physical business establishment.

* * * * *